US008096355B2

(12) United States Patent
McDaniel et al.

(10) Patent No.: US 8,096,355 B2
(45) Date of Patent: Jan. 17, 2012

(54) ANALYSIS OF RADAR RANGING DATA FROM A DOWN HOLE RADAR RANGING TOOL FOR DETERMINING WIDTH, HEIGHT, AND LENGTH OF A SUBTERRANEAN FRACTURE

(75) Inventors: Robert R. McDaniel, Houston, TX (US); Michael Lynn Sheriff, Plano, TX (US); Eric E. Funk, Ouray, CO (US); Ethan A. Funk, Ouray, CO (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 336 days.

(21) Appl. No.: 12/436,217

(22) Filed: May 6, 2009

(65) Prior Publication Data

US 2009/0277630 A1 Nov. 12, 2009

Related U.S. Application Data

(60) Provisional application No. 61/051,649, filed on May 8, 2008.

(51) Int. Cl.
*E21B 49/00* (2006.01)
(52) U.S. Cl. .................................................. 166/250.1
(58) Field of Classification Search ................ 166/250.1
See application file for complete search history.

(56) References Cited

U.S. PATENT DOCUMENTS

| | | | |
|---|---|---|---|
| 3,002,091 A | 9/1961 | Armstrong | |
| 3,019,341 A | 1/1962 | Monaghan | |
| 4,814,768 A * | 3/1989 | Chang | 342/22 |
| 5,413,179 A | 5/1995 | Scott, III | |
| 5,441,110 A | 8/1995 | Scott, III | |
| 5,552,786 A * | 9/1996 | Xia et al. | 342/22 |
| 6,460,936 B1 * | 10/2002 | Abramov et al. | 299/17 |
| 7,082,993 B2 | 8/2006 | Ayoub et al. | |
| 7,598,898 B1 * | 10/2009 | Funk et al. | 342/22 |
| 2005/0274510 A1 * | 12/2005 | Nguyen et al. | 166/250.12 |
| 2006/0102345 A1 | 5/2006 | McCarthy et al. | |
| 2007/0090989 A1 | 4/2007 | Weil | |
| 2008/0062036 A1 * | 3/2008 | Funk et al. | 342/22 |
| 2010/0066560 A1 * | 3/2010 | McDaniel et al. | 340/854.9 |

OTHER PUBLICATIONS

Liu, Fracture Characterization Using Borehole Radar: Numerical Modeling, in water, Air, and soil Polluston: Focus. 2006. pp. 17-34.

* cited by examiner

*Primary Examiner* — Jennifer H Gay
*Assistant Examiner* — Blake Michener

(57) ABSTRACT

Radar ranging data are collected from a down hole tool at various depths in a fractured well bore, and analyzed to provide a profile of the length of each wing of the fracture as a function of depth. The height of the fracture is determined from the vertical positions where the fracture is just observed or no longer observed as the tool is raised or lowered. For consecutive depths along the fracture (and for selected elevations from each depth for the case of a switchable antenna beam), reflection intensity as a function of range is measured. Simulated radar data are computed from a fracture model having the height of the fracture begin measured. The fracture model is varied and the resulting simulated data are correlated with the survey data until a match of minimal error is determined.

11 Claims, 12 Drawing Sheets

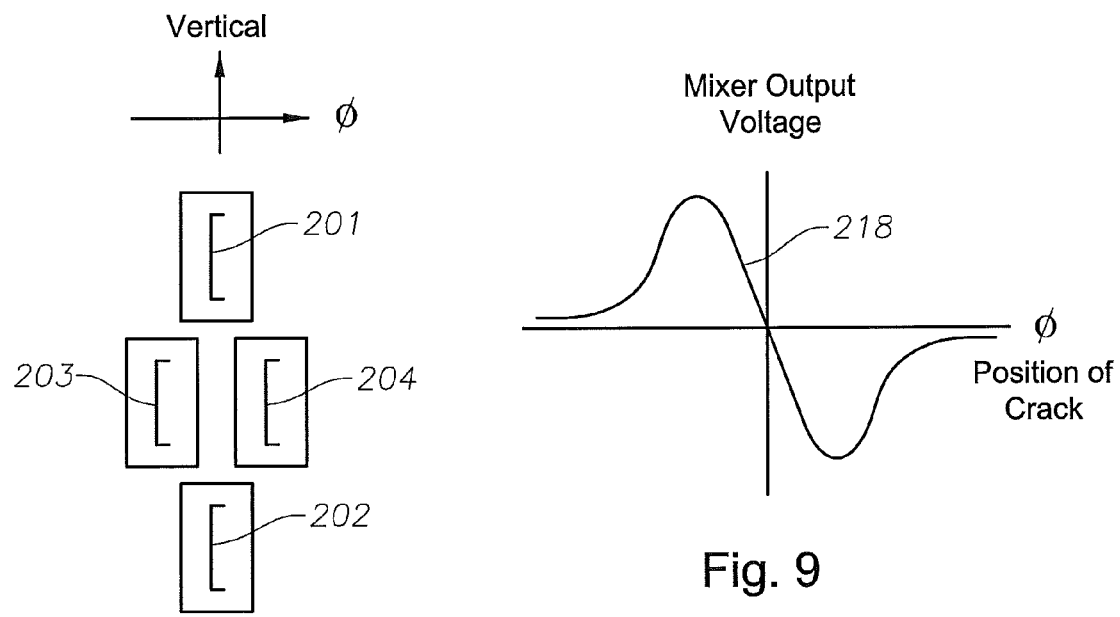
Fig. 7
Fig. 9
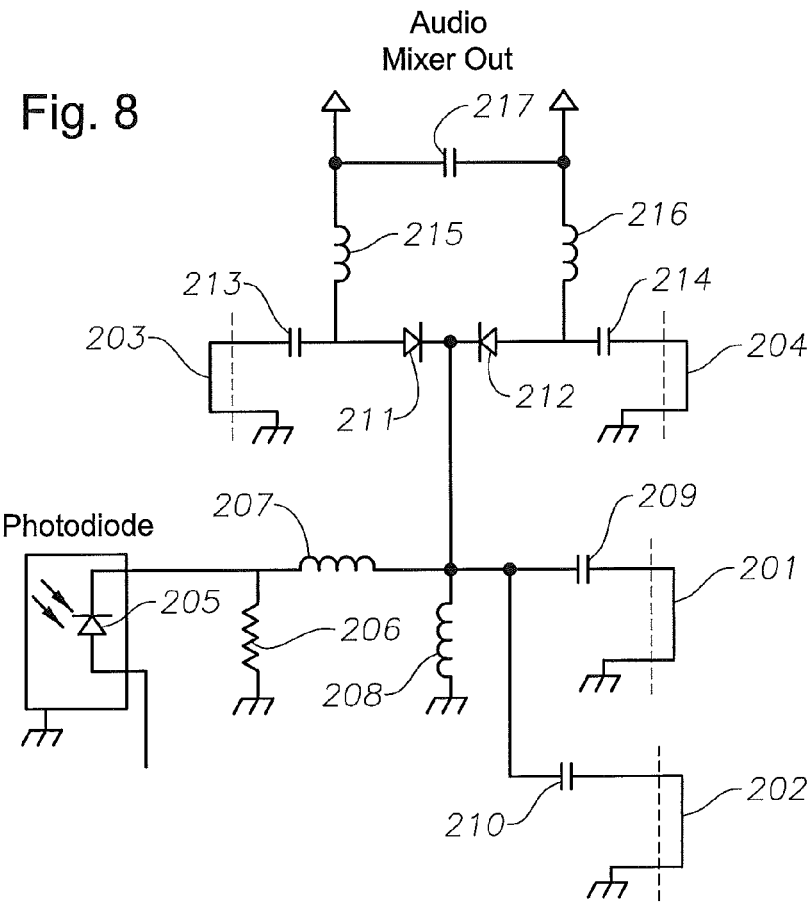
Fig. 8

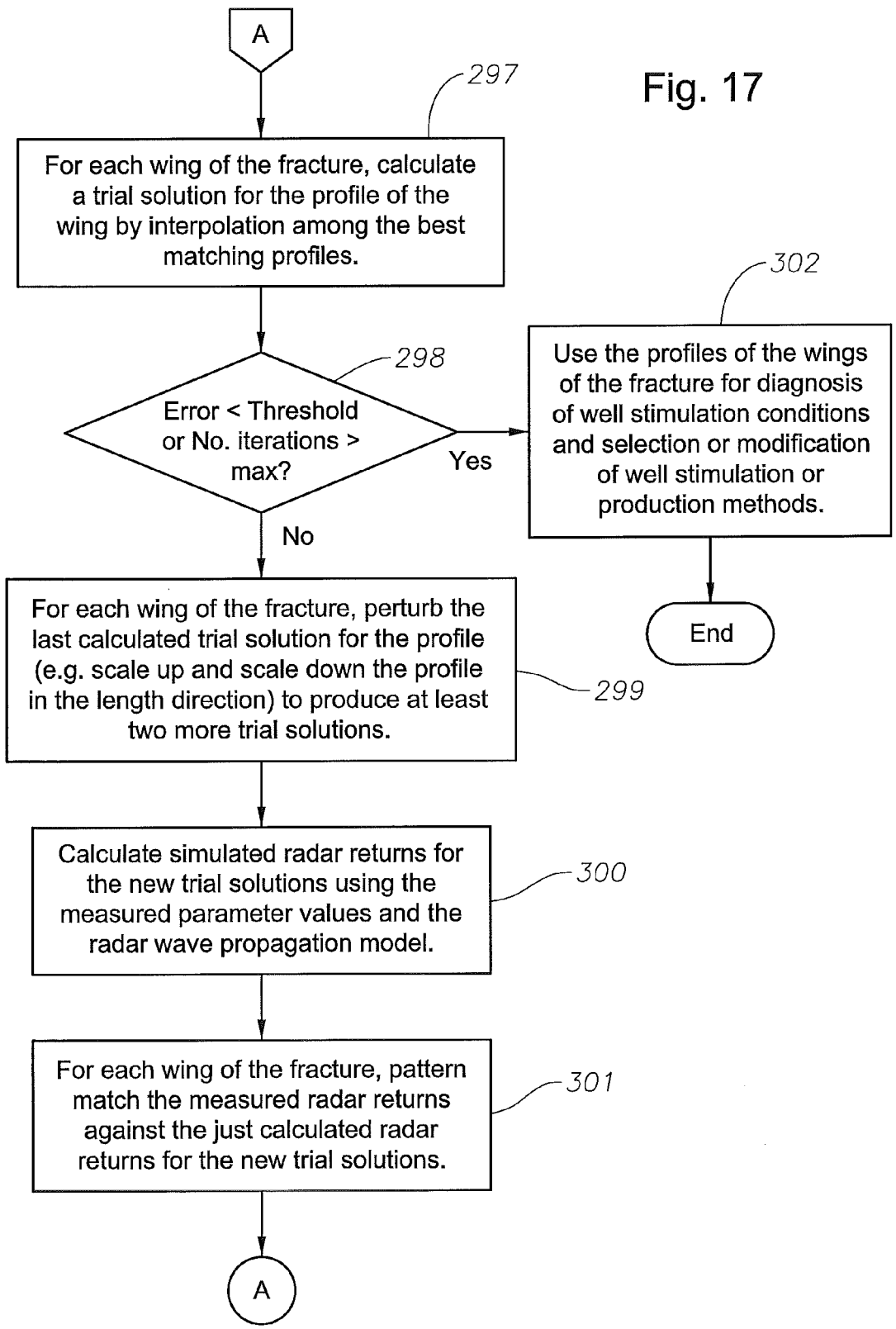

ANALYSIS OF RADAR RANGING DATA FROM A DOWN HOLE RADAR RANGING TOOL FOR DETERMINING WIDTH, HEIGHT, AND LENGTH OF A SUBTERRANEAN FRACTURE

CROSS-REFERENCE TO RELATED APPLICATION AND CLAIM OF PRIORITY

This application claims the benefit of U.S. Provisional Application Ser. No. 61/051,649 filed May 8, 2008, the entire contents of which are hereby incorporated by reference.

FIELD OF THE INVENTION

The present invention relates generally to well logging, and more particularly to collection and analysis of data from a down-hole radar imaging tool.

BACKGROUND OF THE INVENTION

Typically completion of a well bore involves fracturing of the formation around the well bore to enhance or stimulate the flow of hydrocarbon (oil or gas) from the formation into the well bore. For a vertical well bore, the well bore is typically lined with steel casing, and for well completion, perforations are created in the metal casing at pre-determined depths. Horizontal or directionally-drilled wells are often completed without a steel casing at the production region. Completion of a well bore without a steel casing at the production region is known as "open hole" completion. In any case, a fracturing fluid (either with or without propping agents) is pumped at high pressures into the well bore at the production region to create a fracture into the formation for a desired fracture length. Use of a propping agent (also called proppant) in the fracturing fluid prevents the fracture from closing once pumping has ceased. The predominant fracture configuration is in the form of two wedge-like shapes oriented approximately 180 degrees from each other and extending out from the well bore. Such a configuration can be characterized by dimensions of width "W", height "H", and length "L". The propped fracture provides a highly conductive conduit for the hydrocarbon to travel from the reservoir into the well bore.

Often it is desired to measure the dimensions of the fractures extending from the well bore. Measurement of the dimensions of the fractures may help diagnose post stimulation problems such as lower than expected production, and help improve future stimulation treatment designs by verifying design assumptions such as the amount of fracturing fluid and proppant that should be injected into the well bore during a fracturing operation.

For years, radioactive tracers have been used in combination with standard pulsed neutron well logging tools for measuring the fracture height near the well bore. See, for example, U.S. Pat. Nos. 3,002,091; 3,019,341; 5,413,179; and 5,441,110. Non-radioactive tracer material (such as vanadium or indium) is incorporated into coating on proppant that is injected from the tool into the fracture. The tracer material is activated by a pulse of neutrons from the tool. The tracer material then becomes temporarily radioactive, emitting characteristic gamma rays that are visible to the logging tool's spectrometer. The presence of the gamma rays permits a direct measurement of the height of the fracture near the well bore. In addition, the intensity of the gamma rays is proportional to the yield of the pulsed neutron source in the tool and the amount of tracer in the fracture (and therefore directly proportional to the concentration of the proppant in the fracture). Therefore, the radioactive tracer technique also provides an indication of the width of the fracture. The gamma rays, however, have a limited range (about eighteen inches) through the formation. Therefore, the radioactive tracer technique does not provide a direct measurement of the length of the fracture or a profile of how the length of the fracture may vary with depth.

As described in McCarthy et al. U.S. Pat. App. Pub. 2006/0102345 published May 18, 2006, and incorporated herein by reference, the geometry of a subterranean fracture is determined by introducing into the fracture a target particle and/or proppant having a dielectric constant of greater than or equal to about 2; transmitting into the fracture electromagnetic radiation having a frequency of less than or equal to about 3 gigahertz; and analyzing a reflected signal from the target particle and/or proppant to determine fracture geometry. (McCarthy, abstract.)

A logging tool is either raised or lowered so as to traverse the formation from bottom to top or from top to bottom. The logging tool is also rotated in the borehole to detect the location of the fracture. During such traversal and/or rotation, the logging tool transmits electromagnetic radiation having a frequency from 300 MHz to 100 GHz, or any portion thereof, into the formation. The electromagnetic radiation can be advantageously pulsed into the fracture from the logging tool. The receiver collects electromagnetic radiation signals from the proppants, particles, walls of the fracture or other fracture surfaces and transmits these up hole to a computer that can analyze the signals and with the help of software to develop an image of the fracture. The image of the fracture would provide data pertaining to the length and the height of the fracture (and azimuth or direction). (McCarthy, paragraph [0022].)

In another embodiment, the electromagnetic radiation can comprise spread spectrum continuous wave signals. The peak to average power ratio of continuous wave signals is low, which permits the emission of electromagnetic radiation signals down hole with a fiber optic cable and a photodiode. (McCarthy, paragraph [0066].)

As the fracture width (the separation of the walls of the fracture is termed the width) narrows, energy from the electromagnetic radiation pulse will be returned and the spectral content of the returned pulse will carry useful geometric information that will be used to characterize the fracture. Many detection schemes are possible. It may be advantageous for example to monitor the returned energy in a narrow band as a function of time (frequency domain) or accurate data may be achieved by high-resolution sampling in a very narrow time window and moving the window over subsequent pulses to map out the response (time domain). Interferometric synthetic aperture radar (SAR) techniques may also be employed to utilize valuable phase information as the antenna is moved up and down in the well bore. Finally, it may be advantageous to employ multiple frequency band pulses, using different antennas to be able to map the response over a very large frequency band. In one embodiment, the logging tool may employ more than one antenna along with the associated circuitry that allows the use of multiple frequencies to screen and to determine the geometry of the fracture. In another embodiment, the logging tool may employ a variable antenna to permit the transmission and receipt of frequencies having a large range in wavelength sizes. (McCarthy, paragraph [0067].)

SUMMARY OF THE INVENTION

It is desired to provide a system and method for collecting radar ranging data from a down hole radar ranging tool at various depths in a fractured well bore, and for analysis of the radar ranging data to provide a profile of the length of each wing of the fracture as a function of depth. Such a profile is useful for diagnosis of well stimulation conditions and selection or modification of well stimulation or production methods. The ranging data are collected at consecutive locations as the tool is raised or lowered (across a targeted interval) in the well bore.

The down hole radar ranging tool includes a radar transceiver using a single antenna for transmission and reception, or the tool includes a radar transmitting antenna and a separate radar receiving antenna. In a preferred arrangement, a signal for transmission and a "local oscillator" signal are sent down hole optically over one or more low-loss single-mode optical fibers. The down-hole radar circuitry includes one or more photo-diodes for converting the optical signals to electrical signals. The signal for transmission is transmitted from the tool into the fracture. The down-hole radar circuitry receives a return signal from the fracture. A mixer in the down-hole radar circuitry produces an audio-IF signal from the "local oscillator" signal and the return signal from the fracture. The audio-IF signal is sent up-hole over one or more copper wires.

The signal for transmission and the local oscillator signal are selected so that the mixer produces an audio IF signal having frequency or amplitude components indicating the round-trip travel-time of the reflected radar signal. The audio-IF signal is amplified, digitized, and processed digitally to produce, for each increment of depth, a radar return providing a return amplitude as a function of range (for the case of an incoherent radar system), or a return amplitude and phase as a function of range (for the case of a coherent radar system).

The down-hole radar transceiver antenna or the transmitting and the receiving antennas can have either fixed or selectable directional characteristics. For example, the transceiver antenna or the transmitting antenna and the receiving antenna can be a phased array having multiple elements stacked vertically with respect to the axis of the down-hole tool. Therefore, at each height position of the tool, it is possible to obtain multiple and substantially independent measurements of reflection intensity as a function of range, in order to obtain a more detailed profile of the fracture.

The height of the fracture is determined by the vertical positions where the fracture is just observed or no longer observed as the tool is raised or lowered.

The measurements of reflection intensity as a function of range for the various depths (and for selected elevations from each depth for the case of selectable antenna directional characteristics) are processed by applying wave propagation techniques to a fracture model in order to produce a profile of fracture length as a function of height. In other words, a profile is constructed that, in accordance with the model, produces in simulation closely matching reflection intensities as a function of range at the various depths. For example, simulated radar data are computed from a fracture model having the height of the fracture begin measured. The fracture model is varied and the resulting simulated data are correlated with the survey data until a match of minimal error is determined.

The fracture is modeled as a wedge-shaped dielectric waveguide in the rock formation. Thus, for round trip times of up to twice the length of the fracture, a radar wave guided by the fracture will have a velocity that is less than that of the surrounding rock formation. More importantly, the radar wave guided by the fracture will have attenuation per unit length that is less than that of the surrounding rock formation. Therefore, it is possible to distinguish the case for which a radar antenna is aligned with solid rock from the case for which the radar antenna is aligned with the fracture.

Because the fracture typically has a width that gradually decreases to zero as a function of horizontal distance away from the well bore, there may not be a sharp peak in the intensity of the return for a round trip time of twice the length of the fracture. However, as long as the radar system has a sufficiently large dynamic range and a sufficiently low noise floor at a round trip time of twice the length of the fracture, the length of the fracture should correspond to the greatest recorded range with a significant return. Nevertheless, there may be some returns having traveled along diagonal paths more than twice the length of the fracture. Despite these returns along diagonal paths, there should be a "knee" in the reflection intensity versus range curve at a range indicative of the length of the fracture. Thus, by applying the propagation model to the reflection intensity versus range curve, it is possible to more precisely map the time scale of the returns to the distance scale for fracture lengths, and to more precisely map the "knee" in the reflection intensity versus range curve to the length of a particular fracture. Also, the shape of the "knee" in the reflection intensity verses range curve measured at any particular depth is a function of the fracture lengths over a range of neighboring depths, so that a more precise determination of the fracture length profile over the range of depths is made by consideration of the measurements made at increments of depth over the range of depth of the fracture at the well bore.

In a specific implementation, pattern matching is used for selecting among typical facture profiles stored in a computer library. For each typical fracture profile, the computer library stores sets of simulated radar returns over a range of depths. The simulated radar returns are pre-calculated assuming typical wave propagation parameters for a fracture. By applying wave propagation techniques to the model, a reflection intensity versus range function is computed for each pre-selected depth increment within the height of the typical fracture profile.

For a given set of measured radar returns as a function of vertical position of the tool and for a measured height of a wing of a fracture, the measured radar returns are pattern matched against the simulated radar returns for the typical fracture profiles in the computer library. An estimate for the profile of the measured fracture is computed by interpolating among the typical profiles having the best matching set of simulated radar returns.

The estimate from the pattern matching may be used as a trial solution in an iterative successive approximation procedure to improve upon the estimate. In such an iterative procedure, the estimate produced by the pattern matching procedure is perturbed in a few ways to produce more trial solutions, and the wave propagation model is applied to the all the trial solutions to calculate reflection intensity versus range functions for each of the trial solutions. The measured range curves are pattern matched against the range curves for the trial solutions, and again a new trial solution for the profile of the fracture is computed by interpolating among the trial solutions having the best matching range curves.

BRIEF DESCRIPTION OF THE DRAWINGS

Additional features and advantages of the invention will be described below with reference to the drawings, in which:

FIG. 7 is a radar transceiver antenna array for probing the width of a wing of the fracture at the well bore;

FIG. 8 is a mixer circuit for the radar transceiver antenna array of FIG. 7;

FIG. 9 is a graph of mixer output voltage as a function of azimuth about the down-hole tool when the width of a wing of the fracture is probed at the well bore by the radar transceiver array of FIG. 7;

FIGS. 16 and 17 together comprise a flow chart of a particular method of determining and using fracture profiles obtained by analysis of radar returns from a down-hole radar ranging tool.

Figure 1:
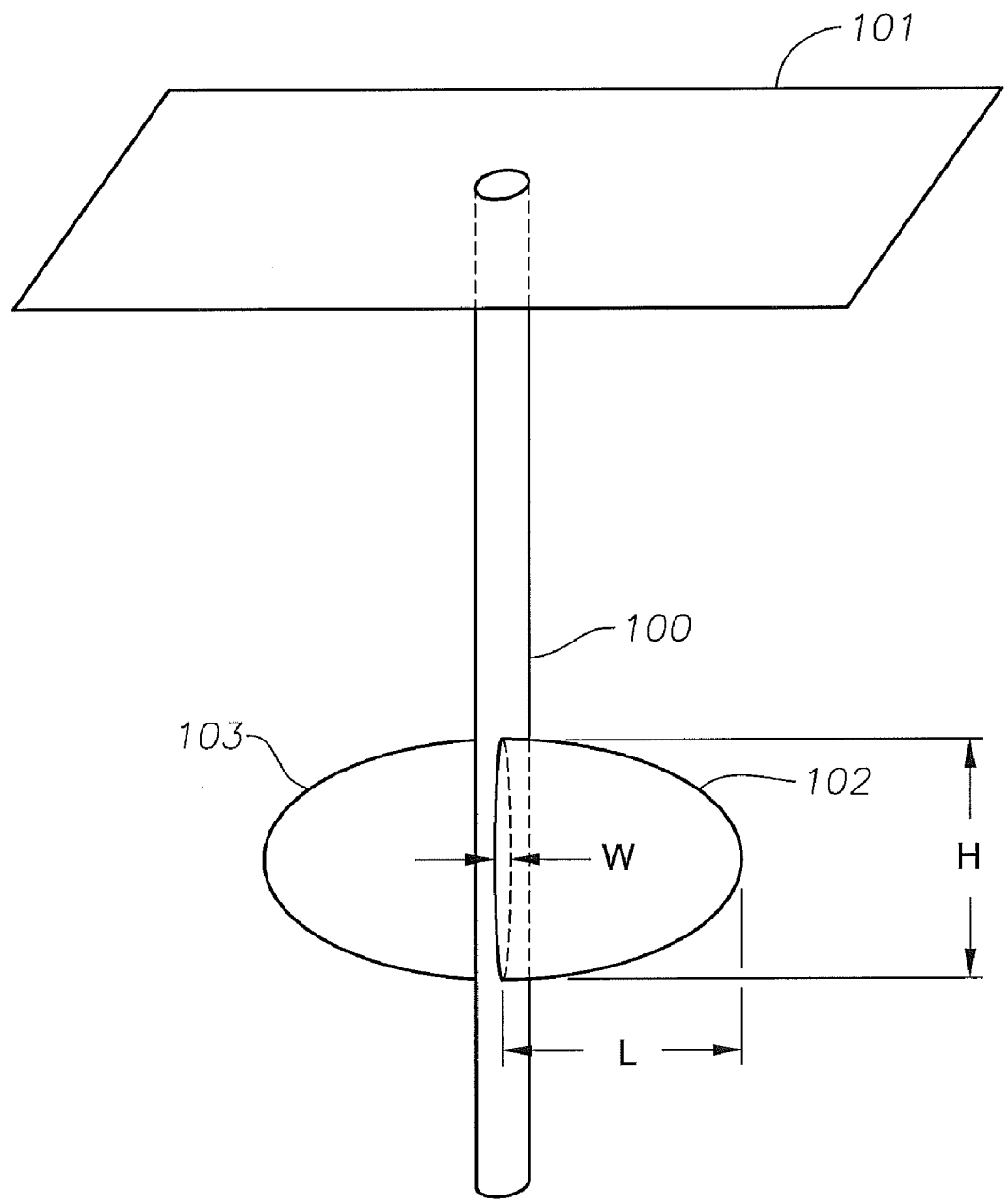
FIG. 1 shows dimensions and a typical profile of a fracture about a well bore.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a well bore 100 extending from the earth's surface 101 to a fracture having two wings 102, 103. Typically the wings 102, 103 are wedge-like shapes oriented approximately 180 degrees from each other and extending out from the well bore 100. Such a configuration can be characterized by dimensions of width "W", height "H," and length "L".

It is desired to provide a system and method for collecting radar ranging data from a down hole radar ranging tool at various depths in a fractured well bore, and for analysis of the radar ranging data to provide a profile of the length of each wing of the fracture as a function of depth. A suitable down-hole radar ranging tool is described in Funk et al. U.S. Pat. App. Pub. 2008/0062036 published Mar. 13, 2008, incorporated herein by reference. Such a down-hole radar ranging tool includes a radar transceiver using a single antenna for transmission and reception, or the tool includes a radar transmitter antenna and a separate radar receiving antenna.

Figure 2:
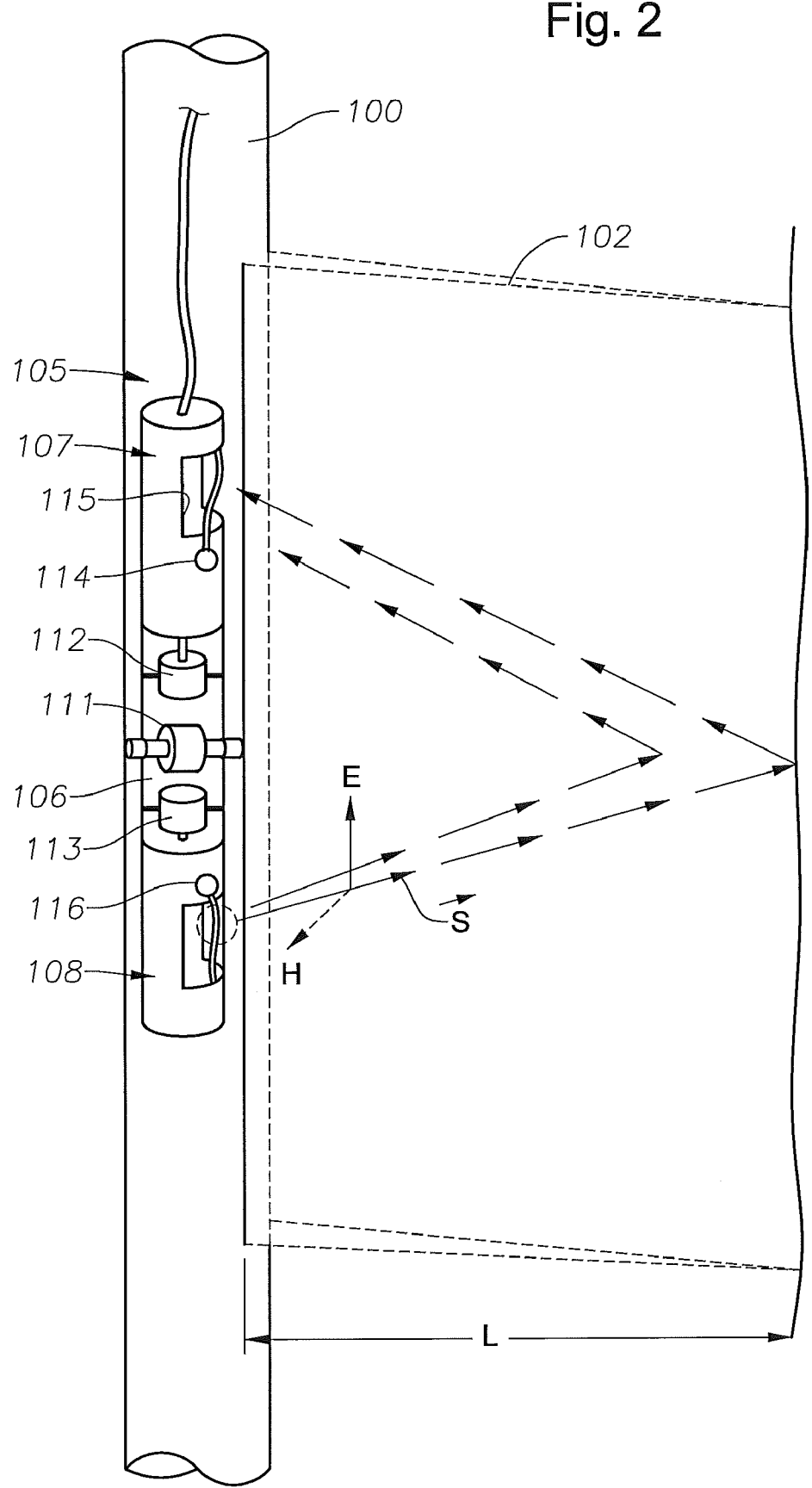
FIG. 2 shows a down-hole radar ranging tool employing separate transmitter and receiver antennas.

FIG. 2 shows a down-hole radar ranging tool 105 having a top receiver segment 107, a middle segment 106, and a bottom transmitter segment 108. The middle segment 106 a locking mechanism 111 for fixing the position of the middle segment within the well bore 100. The middle segment 106 also includes a motor 112 for rotating the receiver segment 107 about the longitudinal axis of the tool, and a motor 113 for rotating the transmitter segment 108 about the longitudinal axis of the tool. The middle segment 106 may also include a motor and jack screw (not shown) for precisely raising and lowering the transmitter section and the receiver section once the position of the middle segment is fixed in position with respect to the well bore 100. The receiver segment 107 includes a window 115 for radar reception, and the transmitter segment 108 includes a similar shaped window. In practice, the windows are covered by an epoxy-fiberglass tube (not shown) surrounding the receiver segment 108 and the transmitter segment 107.

In operation, the motor 113 rotates the transmitter 108 to align the transmitter window with a wing 102 of the fracture. The motor 112 rotates the receiver 107 to align the receiver window 115 with the same wing 102 of the fracture. For example, each of the transmitter segment 108 and the receiver segment 107 may include a respective crack sensor (as further described below with respect to FIGS. 7 to 9) for aligning the segments 107, 108 with the wing 102 of the fracture. A radar ranging tool using a transceiver can align the transceiver with the crack of a fracture without a crack sensor by sensing and maximizing radar returns from the wing of the fracture.

As shown in FIG. 2, the transmitter 116 and the receiver 114 are designed to transmit and receive a radar signal having its electric field vector (E) in the plane of the fracture 102. A dielectric waveguide model for the wing of the fracture 102 indicates that radar waves should be preferentially guided by the fracture 102 when the electric field vector lies in the plane of the fracture. However, it has been found that radar returns also occur then a transceiver antenna is aligned to transmit and receive a radar signal that is horizontally rather than vertically polarized with respect to a vertical fracture.

Figure 3:
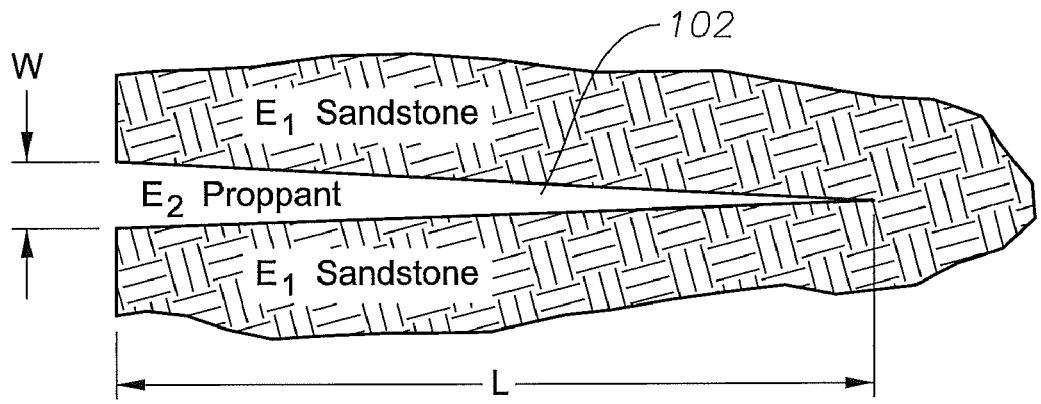
FIG. 3 shows a wing of a fracture modeled physically as a wedge-shaped dielectric sheet waveguide.
Figure 4:
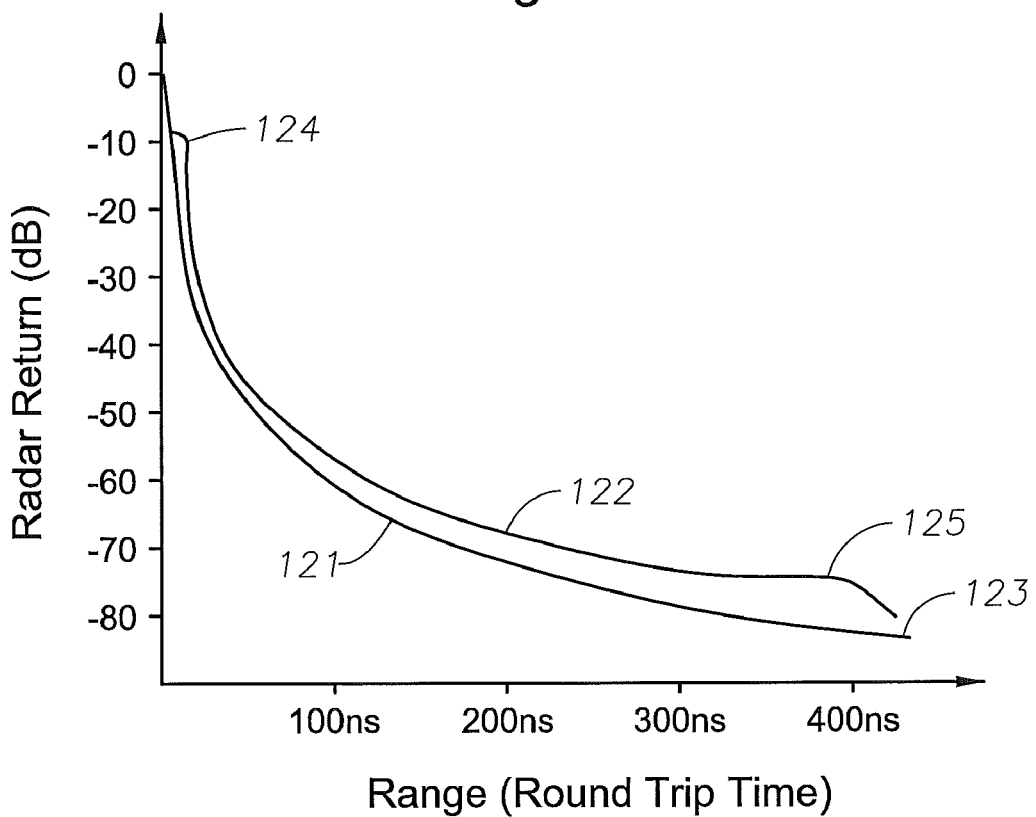
FIG. 4 shows a radar return for a rock formation and for a wing of a fracture in the rock formation.

FIG. 3 shows a wing of a fracture modeled physically as a wedge-shaped dielectric sheet waveguide. As is well known, a dielectric sheet will guide propagation of an electromagnetic wave so long as the dielectric constant of the sheet is greater than the dielectric constant of the surrounding media. See, for example, pages 385-392 of Sophocles J. Orafanidis, *Electromagnetic Waves and Antennas*, Rutgers University, 2008. Such a dielectric sheet will guide electromagnetic waves that are polarized transversely as well as normally with respect to the sheet, although electromagnetic waves that are polarized transversely are guided preferentially. See, for example, page 2581 of Francesco Morichetti et al., "Box-Shaped Dielectric Waveguides: A New Concept in Integrated Optics?" *Journal of Lightwave Technology*, Vol. 25, No. 9, September 2007, pp. 2579-2589.

In practice, the rock formation often is sandstone impregnated with liquid hydrocarbon. Sand has a relative dielectric constant of about 2.5 to 3.5, and petroleum has a dielectric constant of about 2. Proppant often is a ceramic material having a dielectric constant substantially greater than 3.5, so that the propped fracture 102 should function as a dielectric waveguide. Proppant may also be manufactured to have a relatively large dielectric constant and low loss at the 1 GHz microwave frequency preferred for transmission of the radar signals. For example, alumina has a relative dielectric constant of about 4.5. Alumina ceramics can be formulated to have low loss at 1 GHz, for example, by reducing the amount of sodium in the alumina, and by immobilizing sodium in the alumina with effective amounts of magnesium or titanium.

In a preferred arrangement, as described in Funk et al. U.S. Pat. App. Pub. 2008/0062036 published Mar. 13, 2008, a signal for transmission and a "local oscillator" signal are sent down hole optically over one or more low-loss single-mode optical fibers. The down-hole radar circuitry includes one or more photo-diodes for converting the optical signals to electrical signals. The signal for transmission is transmitted from the tool into the fracture. The down-hole radar circuitry receives a return signal from the down-hole tool. A mixer in the down-hole radar circuitry produces an audio-IF signal from the "local oscillator" signal and the return signal. The audio-IF signal is sent up-hole over one or more copper wires.

The signal for transmission and the local oscillator signal are selected so that the mixer produces an audio IF signal having frequency or amplitude components indicating the round-trip travel-time of the reflected radar signal. The audio-IF signal is amplified, digitized, and processed digitally to produce, for each increment of depth, a radar return providing a return amplitude as a function of range (in the case of an incoherent system), or a return amplitude and phase as a function of range (in the case of a coherent system).

For example, the transmitted signal and the local oscillator signal can include frequency-swept carrier signals so that a component of the audio-IF signal at a particular frequency indicates receipt of a reflected signal having a particular round-trip travel time. In this case, the audio-IF signal is sampled and a discrete Fourier Transform of the sampled signal is taken to provide plot of reflection intensity as a function of range.

In another example, direct sequence coding is used in which the signal for transmission is a first carrier signal that is phase-reverse keyed by a pseudo-random bit sequence, and the local oscillator signal is a second carrier signal shifted in frequency from the first local oscillator signal by the audio IF center frequency and phase-reverse keyed by the same pseudo-random bit sequence shifted in time by a selected time delay. In this case, the amplitude of the audio-IF signal at the audio-IF center frequency is a measure of the intensity of reflection having a round-trip time equal to the selected delay time. Thus, the delay time can be incrementally increased or decreased to scan for reflections over a desired range of round-trip times.

The transmitted signal and the local oscillator signal can be the same signal sent down-hole over a single optical fiber. For example, a single chirped or frequency-swept carrier can be used for the transmitted signal and the local oscillator signal. Or the transmitted signal and the local oscillator signal can be the same signal that includes a first carrier signal and a second carrier signal, in which the two carrier signals are spaced in frequency by the audio-IF center frequency. For example, the two carrier signals can be constant amplitude signals that are incrementally increased or decreased in frequency, or the two carrier signals can be phase-reverse keyed by respective versions of pseudo-random bit sequences shifted in time by a selected time delay, as described above.

Figure 5:
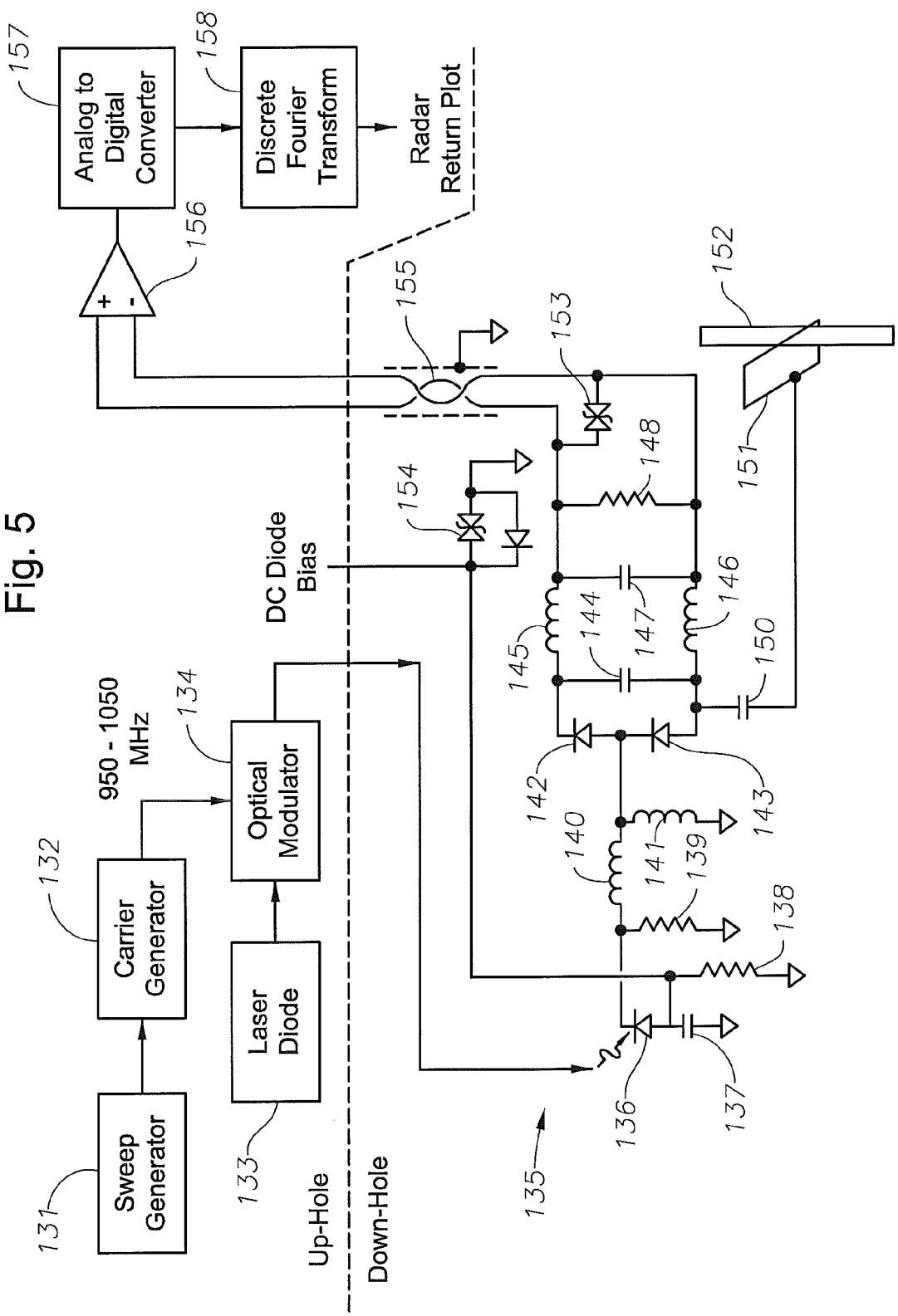
FIG. 5 is a schematic diagram of an incoherent radar system employing a chirped signal and a down-hole radar transceiver.

FIG. 5 shows a specific example of an incoherent radar system employing a chirped signal and a down-hole radar transceiver. A sweep generator 131 produces a signal having a voltage used to control the frequency of a carrier generator 132. For example, the carrier generator 132 produces a constant amplitude carrier signal that is swept in frequency from 950 MHz to 1050 MHz. A laser diode 133 produces an optical signal that is amplitude modulated "on" and "off" at the carrier frequency by an optical modulator 134.

The modulated optical signal from the optical modulator 134 is sent down hole over a single mode optical fiber to the radar transceiver 135, where the modulated optical signal excites an indium-gallium-arsenide PIN photo-diode 136 (Discovery Semiconductor part No. DSC 50). A DC bias signal held on a 10 nf capacitor 127 and 10 K ohm resistor 138 is applied to the diode 136. The diode 135 produces a microwave electrical signal across a 2.2 K ohm resistor 139, and this microwave electrical signal is applied through inductors 140 and 141 to a pair of silicon Schottky mixer diodes (Skyworks Solutions part No. SMS7630-006). An audio signal across the mixer diodes is low-pass filtered by a 100 pf capacitor 144, inductors 145 and 146, a 100 pf capacitor 147, and a 51 ohm resistor 148. The microwave signal is also coupled through a capacitor 150 to a slot antenna 152 through a 50 ohm, ½ wavelength 4:1 balun loop 151. The audio output of the mixer is protected by a voltage limiter 153 (part No. V14MLA0805H), and the DC diode bias is protected by a voltage limiter 154 (part No. DLP05LC-7-F). The audio-IF output signal is fed up-hole via a shielded twisted pair 153 to an audio amplifier 156. The amplified audio signal is digitized by an analog to digital converter 157. The digitized audio signal is converted to radar return range intensity versus round-trip time of travel by a computer 154 calculating a discrete Fourier transform (DFT) over each of a number of sweeps by the sweep generator 131. The computer averages the DFT's over multiple sweeps to produce a radar return plot.

Figure 6:
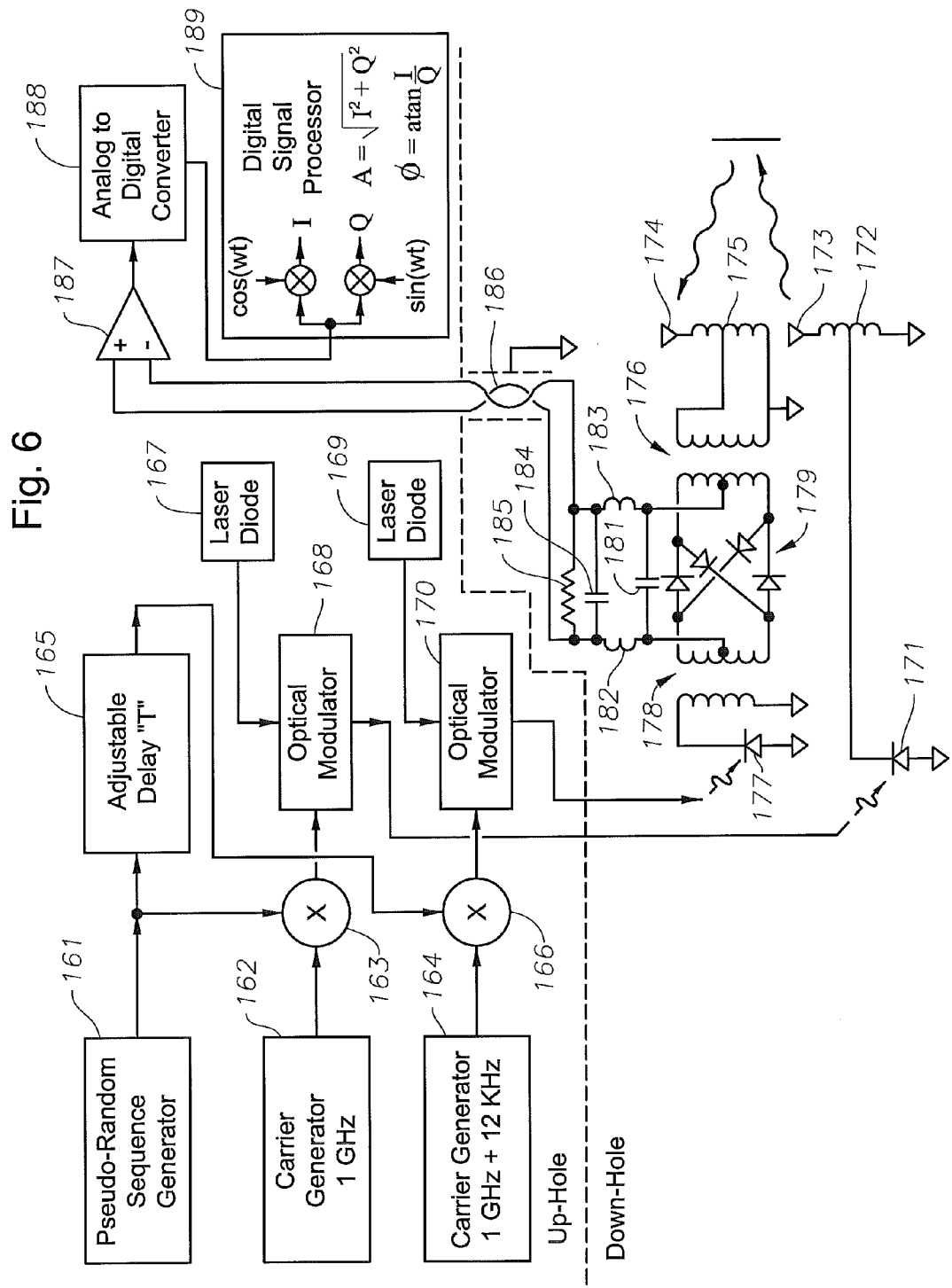
FIG. 6 is a schematic diagram of a coherent radar system employing direct sequence coding and a down-hole radar tool having separate transmitting and receiving antennas.

FIG. 6 shows a specific example of a coherent radar system employing direct sequence coding and a down-hole radar tool having separate transmitting and receiving antennas. A carrier generator 162 generates a 1 GHZ signal for transmission. A balanced mixer 163 phase reverse keys the 1 GHz carrier with a pseudo-random bit sequence from a pseudo-random sequence generator 161. An optical modulator 168 modulates light from a laser diode 167 with the microwave signal from the mixer 163 to produce an optical signal sent down-hole over an optical fiber to a photodiode 171 in the transmitter circuit of the radar ranging tool.

In a similar fashion, a carrier generator 164 produces a local oscillator signal at 1 GHZ plus the audio-IF center frequency of 12 KHz. An adjustable delay unit 164 delays the bit stream from the pseudo-random sequence generator 161 by a time "T", which is selected to be the round-trip time of radar reflections to be analyzed at any given time. A balanced mixer 166 phase-reverse keys the carrier from the carrier generator 164 by the delayed bit stream from the adjustable delay unit 165. An optical modulator 170 modulates light from a laser diode by the output of the mixer 166 to produce an optical signal sent down hole to a photo-diode 177 in the receiver circuit of the radar ranging tool.

In the radar ranging tool, the photodiode 171 produces a 1 GHz microwave signal applied to an impedance matching network 172 feeding a transmitting antenna 173. A receiving antenna 175 receives reflections of the transmitted signal. A matching network 175 applies the received signal to a first balun transformer 174. A local oscillator signal from the photodiode 177 is applied to a second balun transformer 178. The two balun transformers 176 and 179 are connected to a ring of silicon Schottky mixer diodes to form a balanced mixer. The output of this balanced mixer is low-pass filtered by a capacitor 181, inductors 182 and 183, a capacitor 184, and a resistor 185 to produce an audio-IF signal centered about 12 kHz. The audio-IF signal is sent up hole via a shielded twisted pair 186 to an audio amplifier 187. The amplified audio-IF signal is sampled and digitized by an analog to digital converter 188. A computer 189 is programmed to function as a digital signal processor that demodulates the sampled signal by multiplying the sampled signal with a digital cosine signal at 12 KHz to produce an in-phase signal (I) and by multiplying the sampled signal with a digital sine signal at 12 KHz to produce a quadrature phase signal (Q). Each of the I and Q signals is accumulated over an interval for which the delay "T" of the adjustable delay unit 165 has a constant value. An amplitude value (A) and a phase value (φ) of the radar return for a round-trip time of "T" are computed from the accumulated I and Q values according to $A=\text{sqrt}(I^2+Q^2)$ and $\phi=\text{atan}(I/Q)$.

FIG. 7 shows a radar transceiver antenna array for probing the width of a wing of the fracture at the well bore. This radar transceiver is operated at a frequency much higher that 1 GHz, for example at 5 GHz, to give better resolution of the position of the crack. The transceiver array includes an upper transmission loop 201, a lower transmission loop 202, a left reception loop 203, and a right reception loop 204.

FIG. 8 shows a mixer circuit for use with the transceiver antenna array of FIG. 7. In FIG. 8, a photodiode 205 produces a signal at about 5 GHz across a resistor 206. This signal is coupled via inductors 207 and 208 through a capacitor 209 to the upper transmission loop 201 and through a capacitor 210 to the lower transmission loop 202. This signal is also coupled to silicon Schottky mixer diodes 211 and 212. The mixer diode 211 is coupled through a capacitor 213 to the left reception antenna 203. The mixer diode 212 is coupled through a capacitor 214 to the right reception antenna 204. A low pass filter includes inductors 215 and 216 and a capacitor 217 to produce a mixer output signal.

FIG. 9 shows the output voltage 218 of the mixer of FIG. 8 as a function of azimuthal position to the left and right of the center of the crack as the transceiver is rotated about the axis of the well bore. Alignment of the transceiver array with the center of the crack occurs at a central null in the output voltage of the mixer. The maximum amplitude of the mixer signal as the crack is scanned provides an indication of the width of the crack, because the mixer is responding to perturbation of the electric field around the transceiver antennas due to the difference in the dielectric constant of the material in the crack and the material of the rock formation.

The down-hole radar transceiver antenna or the transmitting and the receiving antennas can have either fixed or selectable directional characteristics. For example, the transceiver antenna or the transmitting antenna and the receiving antenna can be a phased array having multiple elements stacked vertically with respect to the axis of the down-hole tool. Therefore, at each height position of the tool, it is possible to obtain multiple and substantially independent measurements of reflection intensity as a function of range, in order to obtain a more detailed profile of the fracture.

Figure 10:
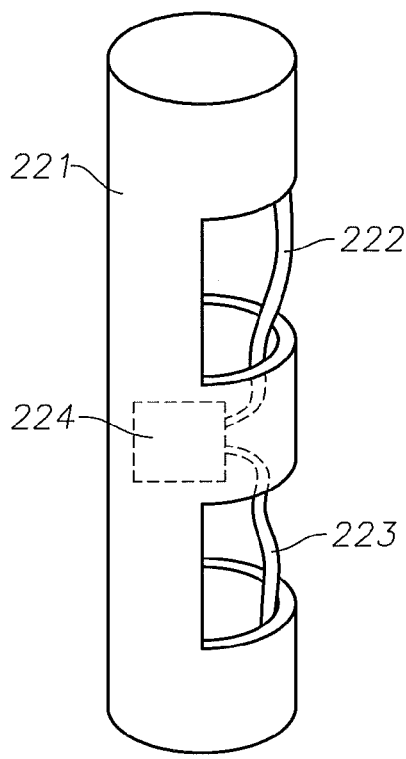
FIG. 10 shows a phased array antenna including two antenna elements.

FIG. 10 shows a phased array antenna including two vertically stacked antenna elements 222 and 223 so that beam of the antenna can be switched either upward by about 30 degrees from horizontal or downward by about 30 degrees from horizontal.

Figure 11:
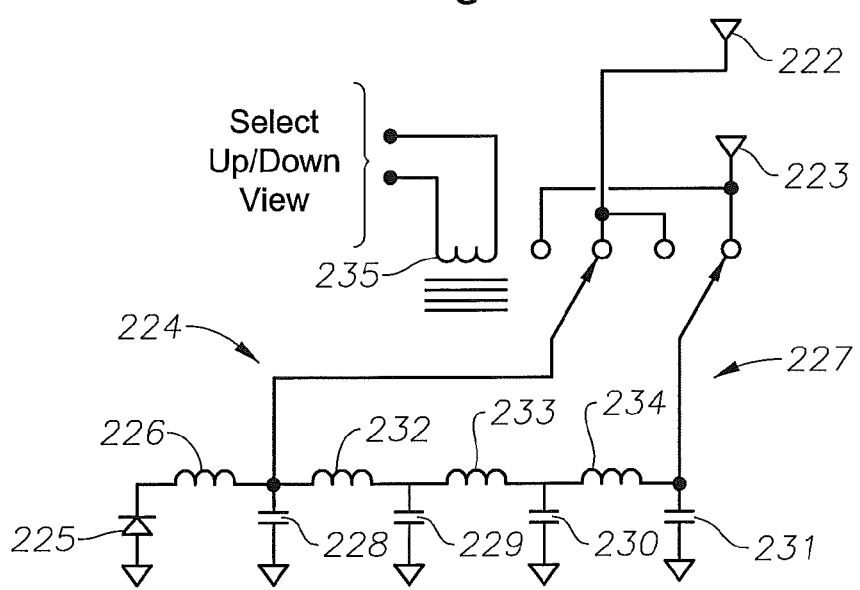
FIG. 11 shows a transmitter circuit for the phased array antenna of FIG. 10.

As shown in FIG. 11, a transmitter circuit 224 includes a photodiode 225 coupled through an inductor 226 to a phase shifting delay line 227 including inductors 232, 233, 234, and capacitors 228, 229, 230, 231. A relay 235 is energized to switch the delay of the delay line 228 between the two antenna elements 222 and 223.

Figure 12:
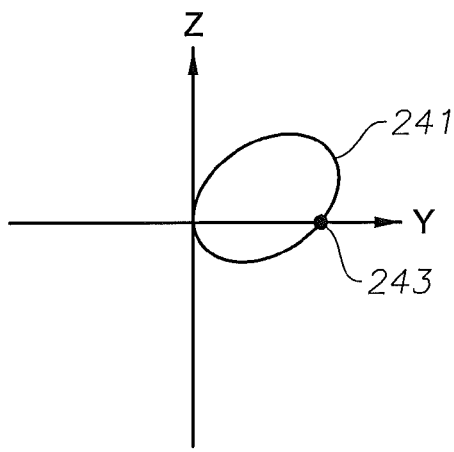
FIG. 12 shows a directivity pattern for the phased array antenna of FIG. 10.

FIG. 12 shows a directivity pattern 241 for the phased array antenna of FIG. 10. The phase delay of the delay line 227 in FIG. 11 is selected so that the half power point 243 of the directivity pattern is on the horizontal axis.

A phased array antenna as shown in FIG. 10 may also be used without switching its beam. For example, the two antenna elements 222 and 223 could be interconnected without a phase shifting network so that the two antenna elements are driven in phase with each other. In this case the beam of the phased array antenna will be horizontal rather than inclined up or down. This will reduce the radar reflections that are collected by the receiver from inclined angles. In comparison to a broad beam from a single element antenna, a narrow horizontal beam would help insure that the length that is measured is closer to the actual horizontal length of the fracture. A similar advantage can be obtained from numerical processing of radar ranging data obtained over a series of depths from a coherent radar system. In a coherent system, the radar ranging information collected from the radar ranging tool contains phase information of the received radar signal. Therefore, a similar reduction of the effects of reflections returned from inclined angles can be obtained numerically by collecting and combining radar ranging data obtained over a series of depths as the radar ranging tool is lowered or raised in the well bore.

Figure 13:
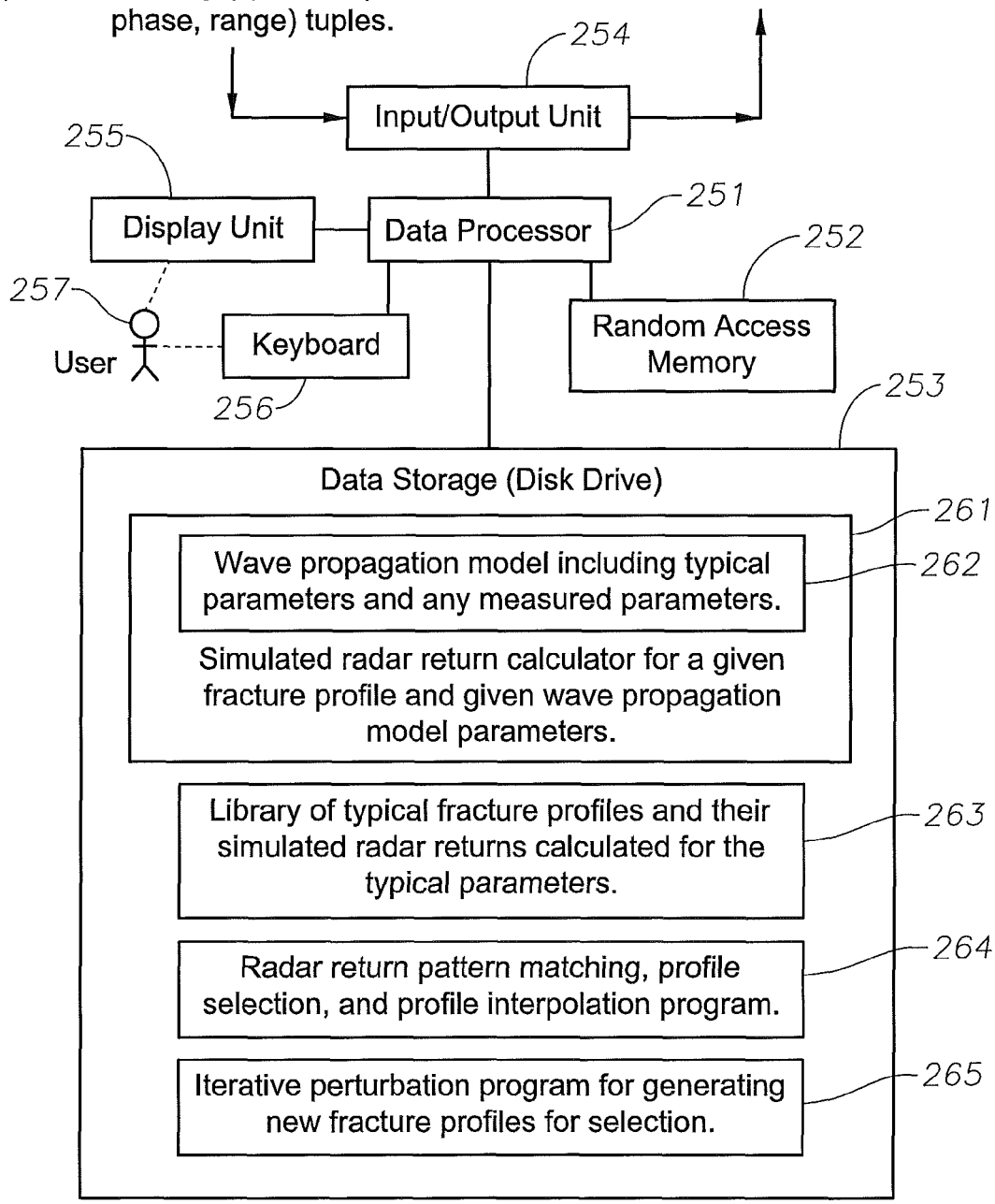
FIG. 13 shows a computer system for calculating a fracture profile from a set of radar returns measured at respective depths as the radar tool is lowered or raised incrementally in the well bore.

FIG. 13 shows a computer system for calculating a fracture profile from a set of radar returns measured at respective depths as the radar tool is lowered or raised incrementally in the well bore. The computer system includes a data processor 251, a random access memory 252, a disk drive 253 providing data storage, a display unit 255, and a keyboard 256 for a system user 257.

The disk drive 253 stores a program 261 for calculating a simulated radar return for a given fracture profile and given wave propagation model parameters. This program includes a wave propagation model 262 that may use pre-programmed typical parameters (such as wave velocity, attenuation, and reflection along a wedge-shaped fracture) or that may use measured parameters. The disk drive 253 also stores a library 263 of typical fracture profiles and their simulated radar returns calculated for the typical parameters. The disk drive 253 also includes a radar return pattern matching, profile selection and profile interpolation program 264. Moreover, the disk drive 253 also stores an iterative perturbation program for generating new fracture profiles for selection.

In the data processing system of FIG. 13, pattern matching is used initially for selecting from the library 263 one or more of the typical fracture patterns having pre-calculated sets of return intensity versus range curves that most closely match the radar returns that were measured as the radar ranging tool was lowered or raised incrementally in the well bore.

Figure 14:
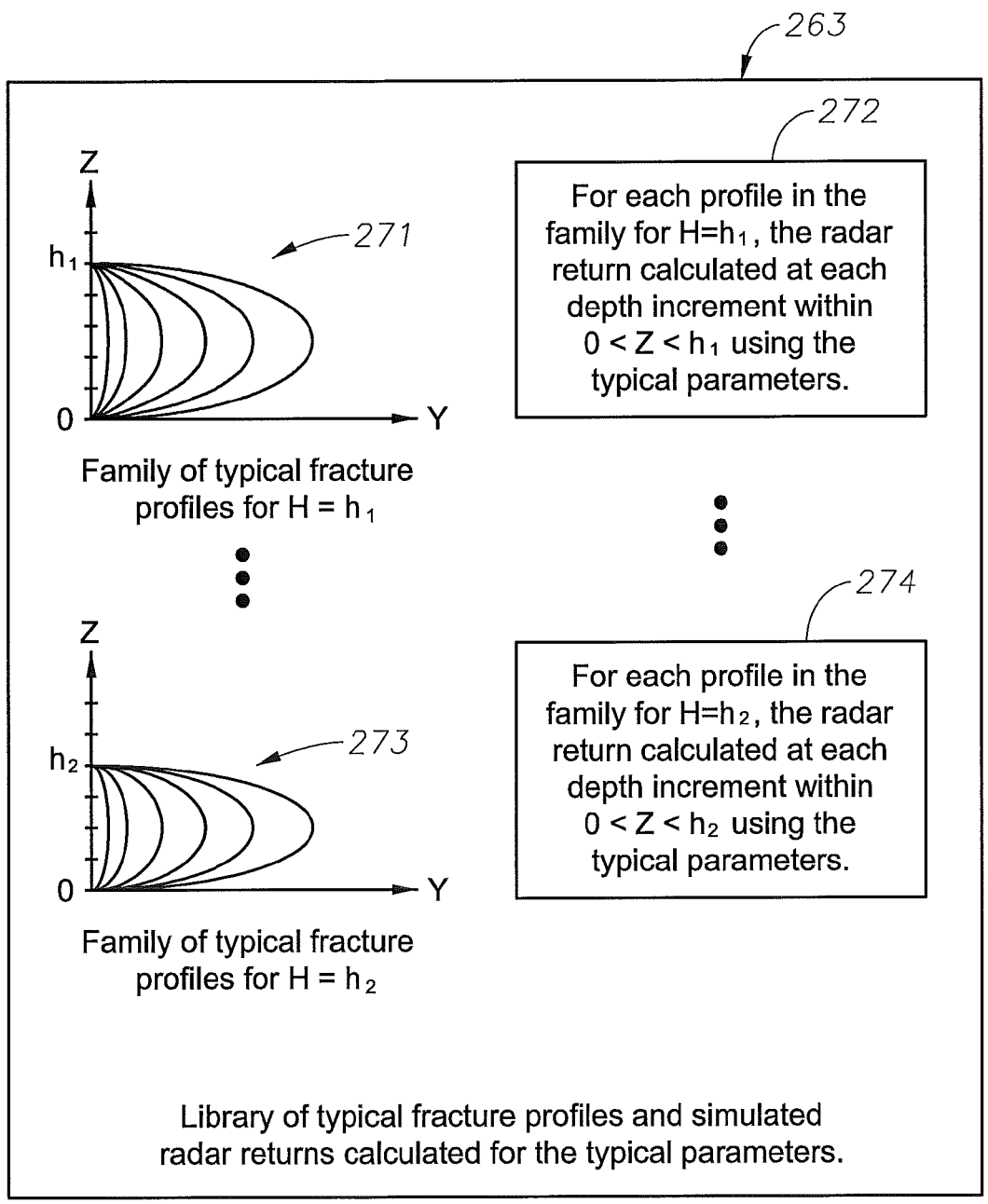
FIG. 14 shows a library of typical fracture profiles and respective sets of simulated radar returns calculated by applying the wave propagation model to the typical fracture profiles.

As shown in FIG. 14, for example, for a given height, the profile of the wing of the fracture is modeled as half of an ellipse such that the height of the fracture is one axis of the ellipse. There is a finite number of these typical elliptical shapes in the library 263, just as there are a finite number of elliptical holes in a drafting template for drawing ellipses. For example, as shown in FIG. 14, for a first value of height (h1), there is a family 271 of such ellipses having different values for their horizontal axes, and for a second value of height (h2), there is another family 273 of such ellipses having different values for their horizontal axes. Then, for a given height, the range curves as a function of the vertical position of the tool depend on the length of the horizontal axis of the ellipse. Also, one assumes that the width of the fracture (which could be measured as a function of vertical position along the well bore) tapers in a linear fashion in the horizontal direction from the well bore to the elliptical periphery of the wing of the fracture. The model also assumes a certain propagation loss for propagation of the radar wave in the fracture in the horizontal and vertical directions, and this propagation loss is a function of the width of the fracture. In a similar fashion, one assumes a certain coefficient of reflection for propagation in the horizontal direction in proportion to the taper of the width in the horizontal direction. Therefore, by applying wave propagation techniques to the model, a reflection intensity versus range function for each typical profile is computed for each of a number of depths over the range of depths from the bottom to the top of each profile. Thus, the computer library 263 includes simulated radar returns 272 for the family 271 of typical fracture profiles having the first height (h1), and simulated radar returns 274 for the family 273 of typical fracture profiles having the second height (h2).

A very simple model for wave propagation could be used, such as a ray projection simulation that would not involve phase calculations or multiple reflections. On the other hand, a complex and precise model could be used that would involve phase calculations by a finite element method of solving partial differential wave equations.

For example, a simple ray projection simulation would project rays at angular increments from the antenna outward with an intensity corresponding to the far-field pattern of the transceiver or transmitter antenna. For each ray, along a certain length of the ray, the intensity of the ray would be decremented by the attenuation per unit length, and a return ray directed back to the transceiver or receiving antenna would be computed by multiplying the intensity of the ray by the reflection coefficient. The return rays would be traced in a similar fashion so that they would in turn be attenuated until they reached the transceiver or receiver antenna. A return for the transceiver or receiver antenna would be the summation of the return rays, again weighted by the far-field pattern of the transceiver or receiver antenna.

Then, for a given set of measured range curves as a function of vertical position of the tool and for a measured height of a wing of a fracture, the measured range curves are pattern matched against the range curves for each of elliptical shapes in the library having a height that is next higher and next lower than the given height. The two shapes in the library having the closest match for each of the next higher and next lower height are selected, giving four selected elliptical shapes from the library and a pattern match coefficient (such as a sum of squares of differences) for each of these four selected elliptical shapes. Then the length of the measured wing of the fracture is computed as a weighted average of the lengths (horizontal axis) of the four selected elliptical shapes, using the respective pattern match coefficients as inverse weighting factors. In other words, the profile of the wing of the fracture is estimated by computing a weighted average of four typical fracture profiles having the closest matching radar returns, and the weighting factors are respective coefficients of correlation between the radar returns collected from the wing of the fracture and simulated radar returns that have been calculated for each of these four typical fracture profiles.

Figure 15:
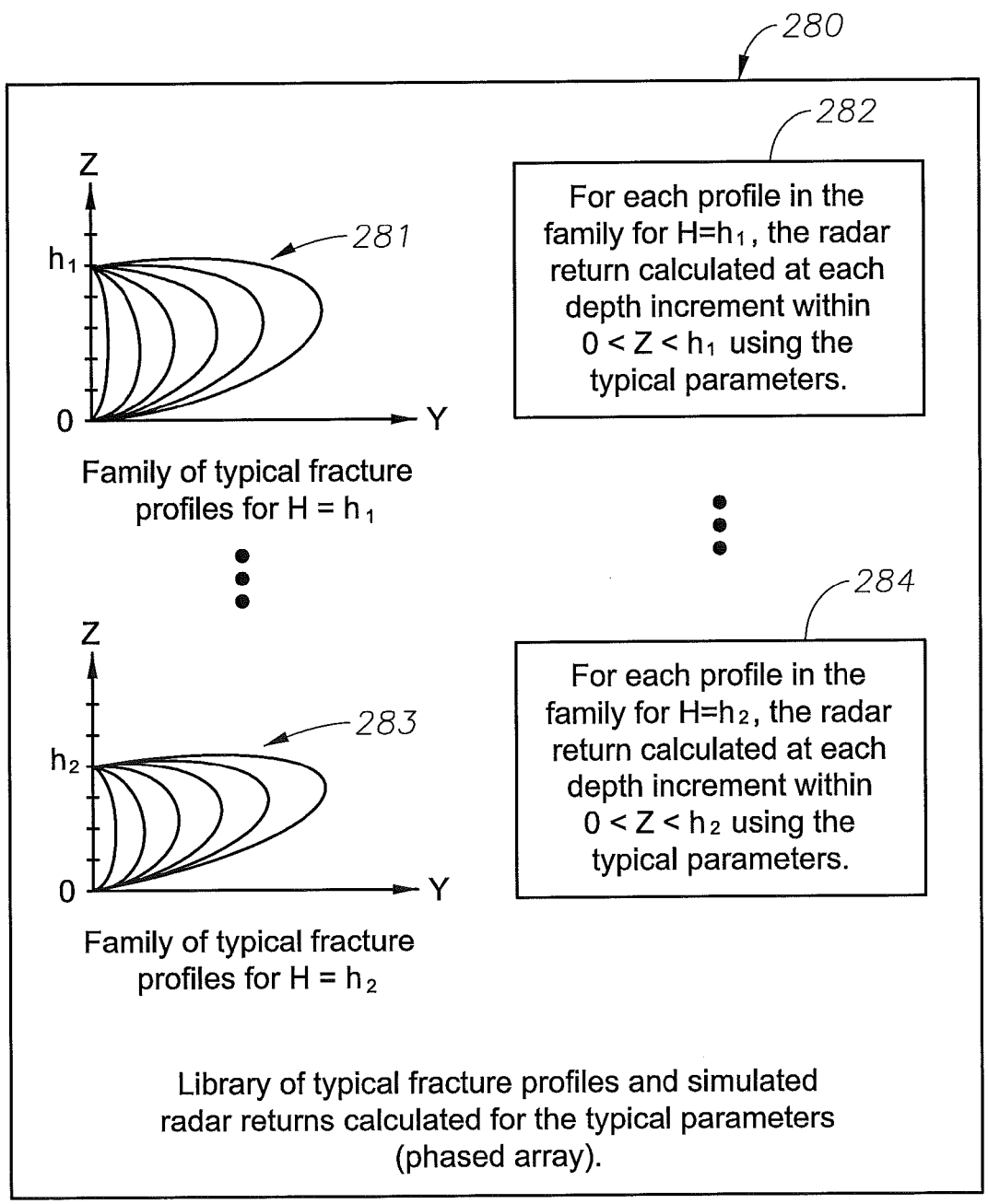
FIG. 15 shows a library of typical fracture profiles and respective sets of simulated radar returns calculated by applying the wave propagation model to the typical fracture profiles for the case of a radar system using the phased array antenna of FIG. 10.

As shown in FIG. 15, if the radar ranging tool uses directional antennas having switchable directional characteristics, then the computer library of the typical fractures and their computed reflection intensity versus range functions may include multiple reflection intensity versus range functions for each of the depths over the range of depths from the bottom to the top of each profile. For example, as described above with respect to FIGS. 11, a single relay may switch the phase offset between two vertically arranged antennas in the phased array antenna to direct the beam of the antenna either upward at an inclined angle or downward at an inclined angle. Thus, at each vertical position of the transceiver, one return response as a function of range is measured for the beam switched upward, and another return response as a function of range is measured for the antenna beam switched downward. A first elliptical shape (rotated to skew upward) is estimated by pattern matching the measured upward return responses to upward return response of shapes in a library of elliptical shapes 280 that are rotated to skew upward. A second elliptical shape (rotated to skew downward) is estimated by pattern matching the measured downward return responses to downward return responses of shapes in the library of elliptical shapes 280 that are rotated to skew downward. The two estimated elliptical shapes are then averaged together in the radial direction from the center of the fracture at the well bore by a weighted average, using the two switched directivity patterns of the phased array as respective weighting factors, to determine an estimate of the profile of the wing of the fracture.

For the case shown in FIG. 15, the stored fracture profiles for the families 281 and 283 and their simulated radar returns 282, 284 for the case of the antenna beam switched upward are symmetrical with respect to the fracture profiles and simulated radar returns for the antenna bean switched downward. Thus, the library need not actually store the profiles and simulated radar returns for the case of the antenna beam switched downward. The library can recall the profile or simulated returns for the case of the antenna beam switched downward and simply invert the z coordinate to provide requested data for the case of the antenna beam switched downward.

Figure 16:
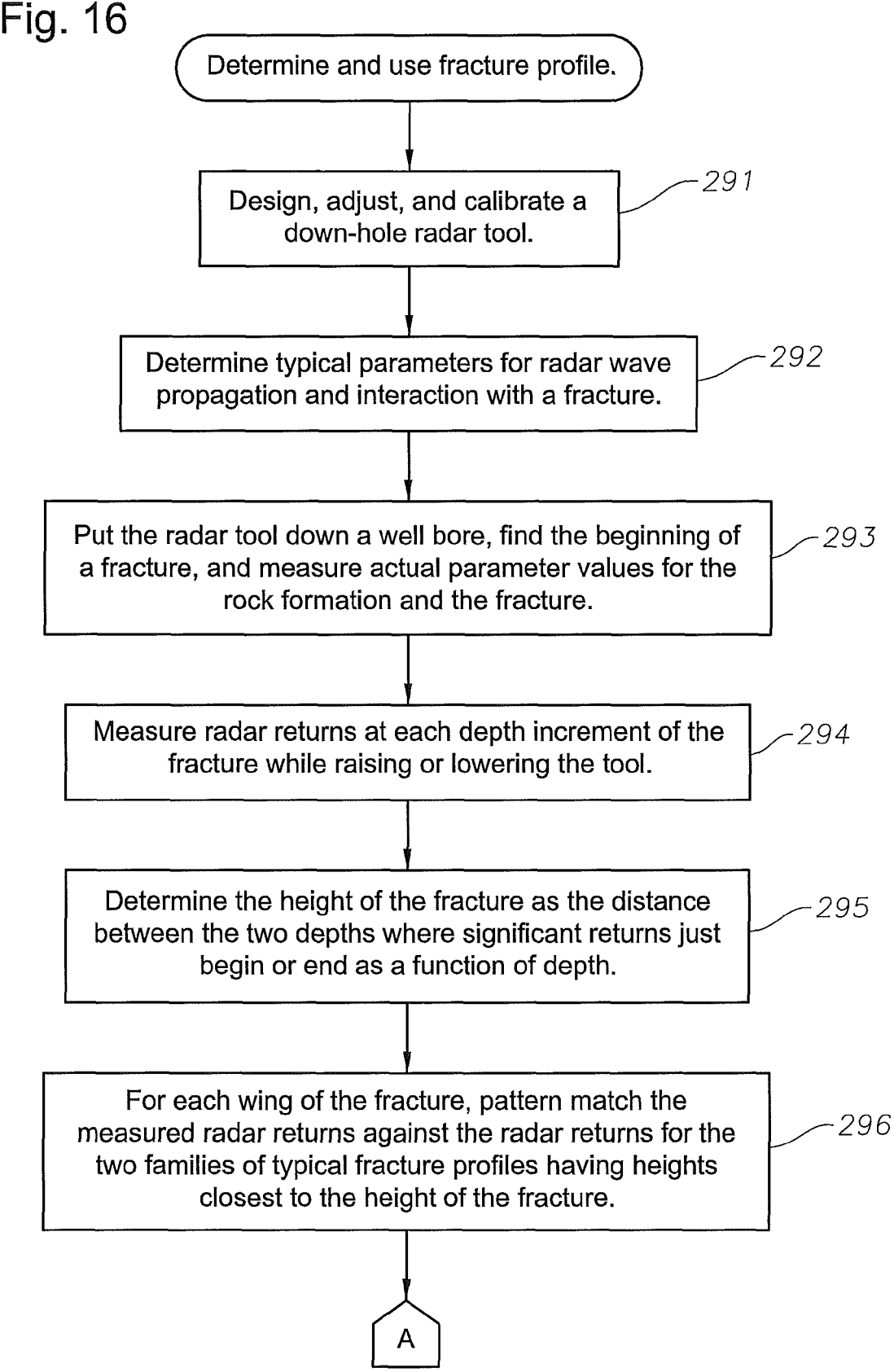

FIG. 16 shows the overall process of determining and using fracture profiles obtained by analysis of radar returns from a down-hole radar ranging tool. In a first step 291, a down hole tool is designed, adjusted, and calibrated for measuring fractures up to a certain length. In step 292, the typical parameters are determined for radar wave propagation and interaction with a fracture. In step 293, the radar tool is put down a well bore to find the beginning of a fracture, and to measure actual parameter values for the rock formation and the fracture. In step 294, radar returns are measured at each depth increment of the fracture while the tool is raised or lowered incrementally in the well bore. In step 295, the height of the fracture is determined as the distance between the two depths where significant returns just begin or end as a function as depth. In step 296, for each wing of the fracture, the measured radar returns are pattern matched against the radar returns for the two families of typical fracture profiles having heights closest to the measured height of the fracture. Execution continues from step 296 of FIG. 16 to step 297 of FIG. 17.

In step 297 of FIG. 17, for each wing of the fracture, a trial solution for the profile of the wing is calculated by interpolation among the typical profiles having the best matching radar returns. The interpolation is a weighted average using weighting factors that are respective coefficients of correlation between the measured radar returns collected for each wing of the fracture and the simulated radar returns of each of the best matching typical profiles. If the error between the measured returns and the best matching returns of a typical profile is not less than a threshold (and if the number of iterations has not become greater than a preset maximum number), then execution continues to step 299 to begin an iterative process. In step 299, for each wing of the fracture, the last calculated trial solution is perturbed to produce at least two more trial solutions. For example, the last calculated trial solution is scaled up slightly in the length direction to provide a second trial solution, and the last calculated trial solution is scaled down slightly in the length direction to provide a third trial solution. In step 300, simulated radar returns are calculated for the new trial solutions using the measured parameter values and the radar wave propagation model. In step 301, for each wing of the fracture, the measured radar returns are pattern matched against the radar returns just calculated for the new trial solutions. Execution loops from step 301 back to step 297.

Eventually, in step 298, execution branches to step 302. In step 302, the profiles of the wings of the fracture are used for diagnosis of well stimulation conditions and selection or modification of well stimulation or production methods.

The description above deals mainly with obtaining an accurate estimate of the profile of length of a subterranean fracture as a function of depth for distances far away from the well bore. In this case, the radar system, especially a direct sequence coding system, would not need to scan for returns from regions close to the well bore, and any returns close to the well bore would be excluded from the pattern matching process. However, the pattern matching techniques could be used for recognizing anomalies that could be close to the well bore, especially anomalies that could be near the top or bottom of the fracture. For example, near the top or bottom of the fracture, the fracture could be close to but not in direct communication with the well bore (or for a "closed hole," not in direct communication with a perforation in the well casing), but the fracture at this depth could be sufficiently close to generate significant radar returns. In this case, the radar return may have a characteristic shape that could be recognized by pattern matching to a characteristic shape produced by a known anomaly. The particular shape of the return intensity as a function of range, as seen at a number of different depths, could indicate that the fracture is tilted away from the vertical position, the angle of this tilt, and the extent of the anomaly. Therefore, in addition to typical fracture profiles, the computer data storage library could store some profiles of various anomalies of interest and the radar returns produced by those anomalies.

The radar returns for the anomalies could be computed by applying the radar wave propagation model to the anomalies, or the radar returns for the anomalies could be collected at a test well where the anomalies are physically created. For example, collecting radar returns from a test well for anomalies close to the well bore would avoid a need to adjust the radar wave propagation model for various effects that arise only when the anomalies are close to the radar antennas. Also, it may be desirable to probe anomalies that are close to the well bore with a wide range of microwave frequencies including microwave frequencies up to 10 GHz. For example, for a return peaking at a certain range when using a certain frequency, the presence of an object at that range from the well bore could be verified by observing a similar peak at the same range when using a substantially different frequency.

In view of the above, there has been described a system and method for collecting radar ranging data from a down hole radar ranging tool at various depths in a fractured well bore, and for analysis of the radar ranging data to provide a profile of the length of each wing of the fracture as a function of depth. The height of the fracture is determined by the vertical positions where the fracture is just observed or no longer observed as the tool is raised or lowered. For consecutive depths along the fracture (and for selected elevations from each depth for the case of a switchable antenna beam), reflection intensity as a function of range is measured. Wave propagation techniques are applied to a fracture model in order to construct a profile that in simulation closely matches the measured reflection intensities as a function of range at the various depths. For example, simulated radar data are computed from a fracture model having the height of the fracture begin measured. The fracture model is varied and the resulting simulated data are correlated with the survey data until a match of minimal error is determined.

What is claimed is:

1. A method of computing an estimate of a profile of length of a subterranean fracture as a function of depth, the subterranean fracture extending from a well bore, said method comprising:
   (a) placing a radar ranging tool in the well bore;
   (b) collecting radar ranging data from the radar ranging tool at various depths in the well bore;
   (c) correlating the collected radar ranging data with simulated radar ranging data computed by applying a radar wave propagation model to a determined fracture profile; and
   (d) computing the estimate of the profile of length of the subterranean fracture as a function of depth from the determined fracture profile and the correlation of the collected radar ranging data with the simulated radar ranging data.

2. The method as claimed in claim 1, which further includes using the estimate of the profile of length of the subterranean fracture as a function of depth for selection or modification of a method of stimulation or production of a flow of fluid from the well bore, and applying the selected or modified method of stimulation or production to stimulate or produce the flow of fluid from the well bore.

3. The method as claimed in claim 1, which further includes determining height of the fracture as a distance between two depths where significant radar returns just begin or just end as a function of depth, and wherein the determined facture profile has the determined height of the fracture.

4. The method as claimed in claim 1, wherein the simulated radar ranging data computed by applying a radar wave propagation model to a determined fracture profile is stored in a computer data storage library of typical fracture profiles and simulated radar ranging data computed by applying the radar wave propagation model to the typical fracture profiles, and wherein the determined fracture profile is one of the typical fracture profiles, and wherein the step of correlating the collected radar ranging data with the simulated radar ranging data computed by applying the radar wave propagation model to the determined fracture profile includes recalling the simulated radar ranging data for the determined fracture profile from the computer data storage library, and correlating the collected radar ranging data with the simulated radar ranging data recalled from the computer data storage library.

5. The method as claimed in claim 1, wherein the estimate of the profile of length of the subterranean fracture as a function of depth is computed from the determined fracture profile and the correlation of the collected radar ranging data with the simulated radar ranging data by computing a weighted average of a plurality of fracture profiles, wherein the plurality of fracture profiles includes the determined fracture profile, and the correlation of the radar ranging data with the simulated radar ranging data is used as a weighting factor of the determined fracture profile in the weighted average.

6. The method as claimed in claim 1, which further includes improving the estimate of the profile of length of the subterranean fracture as a function of depth by applying the radar wave propagation model to the estimate of the profile of length of the subterranean fracture as a function of depth to compute simulated radar ranging data for the estimate of the profile of length of the subterranean fracture as a function of depth, correlating the collected radar ranging data with the simulated radar ranging data for the estimate of the profile of length of the subterranean fracture as a function of depth, and using the correlation of the collected radar ranging data with the simulated radar ranging data for the estimate of the profile of length of the subterranean fracture as a function of depth to compute an improved estimate of the profile of length of the subterranean fracture as a function of depth.

7. The method as claimed in claim 1, wherein the radar ranging tool has an antenna with switchable directional characteristics to switch elevation of a beam of the antenna, and wherein the radar ranging data collected from the radar ranging tool at the various depths in the well bore includes radar ranging data collected at each of a plurality of depths when the elevation of the beam of the antenna is switched to a first elevation and when the elevation of the beam of the antenna is switched to a second elevation.

8. The method as claimed in claim 7, wherein the radar ranging data collected from each of the plurality of depths when the beam of the antenna is switched to a first elevation are correlated with simulated radar ranging data for the first elevation to obtain a first correlation, and the radar ranging data collected from each of the plurality of depths when the beam of the antenna is switched to a second elevation are correlated with simulated radar ranging data for the second elevation to obtain a second correlation, and wherein the estimate of the profile of length of the subterranean fracture as a function of depth is computed by using the first correlation to estimate a first profile skewed toward the first elevation, using the second correlation to estimate a second profile skewed toward the second elevation, and combining the first profile with the second profile to determine the estimate of the profile of length of the subterranean fracture as a function of depth.

9. The method as claimed in claim 1, which further includes operating the radar ranging tool to obtain a measurement of velocity of radar wave propagation through a rock formation including the subterranean fracture, and using the measurement of velocity of radar wave propagation in the wave propagation model.

10. The method as claimed in claim 1, wherein the radar ranging tool includes a crack sensor, and the method further includes rotating the crack sensor in the well bore azimuthally to scan the well bore for presence of a crack of the subterranean formation in order to align a radar antenna of the radar ranging tool azimuthally with the crack of the subterranean formation for transmission or reception of radar waves guided by the fracture in the subterranean formation for the collection of the radar ranging data, and the method further includes estimating width of the crack of the subterranean formation from a signal produced by the crack sensor when the crack sensor scans the well bore for the presence of the crack of the subterranean formation.

11. The method as claimed in claim 10, wherein the crack sensor scans the well bore with an electromagnetic signal substantially greater in frequency than the radar waves guided by the fracture in the subterranean formation for the collection of the radar ranging data.

\* \* \* \* \*